3,294,818
SUBSTITUTED DIOXOLANES AND PROCESS FOR THEIR PRODUCTION
George Bobowski, East Orange, John Shavel, Jr., Mendham, and Maximilian von Strandtmann, Rockaway Township, N.J., assignors to Warner-Lambert Pharmaceutical Company, Morris Plains, N.J., a corporation of Delaware
No Drawing. Filed Apr. 6, 1964, Ser. No. 357,798
2 Claims. (Cl. 260—340.9)

This invention relates to a new and novel substituted 1,3-propanediol of the formula:

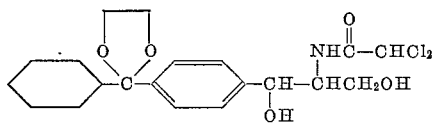

and to a process for the production of the above compound.

The compound of this invention exhibits potent antimicrobial activity and is useful in the treatment of infectious diseases caused by organisms susceptible to the antimicrobial activity of said compound. For example, it has been found effective against both systemic and local infections caused by Staphloccoccus. In addition, it is useful as an intermediate for the production of other novel substituted 1,3-propanediols.

According to this invention the above compound may be prepared by refluxing a substituted 1,3-propanediol of the formula:

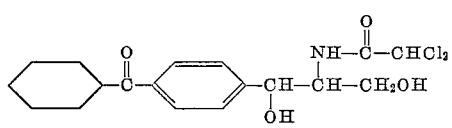

with ethylene glycol in the presence of p-toluenesulfonic acid in an inert anhydrous solvent such as anhydrous benzene or xylene.

The starting material used in the above reaction is described and claimed in copending application Serial No. 231,027, now Patent No. 3,183,265.

The reaction is completed over a period of about 12 hours during which the

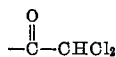

attached to the amino group is split off and results in the formation of D-threo-1-[p-2(cyclohexyl-1,3-dioxolan-2-yl)phenyl]-2-amino-1,3-propanediol. The latter is generally not isolated but is treated directly with an excess of methyldichloroacetate to yield the desired D-threo-1-[p-2(cyclohexyl - 1,3 - dioxolan - 2 - yl)phenyl]-2-(2,2-dichloroacetamido) - 1,3 - propanediol of this invention, the structural formula of which appears above. The reaction product may be recovered from the reaction medium by evaporating the solvent in vacuo.

For therapeutic use the compound of this invention may be combined in the standard pharmaceutical excipients to give dosage forms such as tablets, suspensions, and the like.

The following example is included in order further to illustrate the invention.

*Example 1.—D-threo-1-[p-2-(cyclohexyl-1,3-dioxolan-2-yl)phenyl]-2-(2,2-dichloroacetamido)-1,3-propanediol*

A solution of 0.75 g. of D-threo-1-(p-cyclohexylcarbonyl)-2-(2,2-dichloroacetamido) - 1,3-propanediol, 4.0 ml. of ethylene glycol and 0.1 g. of p-toluenesulfonic acid in 80 ml. of anhydrous benzene is refluxed for 12 hours resulting in the separation of 0.25 ml. of water. After cooling the reaction mixture to 0° C. it is treated with ammonia and the two phases are separated. The organic layer is dried over sodium sulfate, and the solvent is removed in vacuo. The residual gum is refluxed with 3.0 ml. of methyldichloroacetate in 50 ml. absolute ethanol for 4 hours. The solvent and excess reagent are removed in vacuo to give 0.75 g. of D-threo-1-[p-2-(cyclohexyl-1,3-dioxolan-2-yl)phenyl] - 2 - (2,2-dichloroacetamido)-1,3-propanediol as a light-brown semisolid. Two recrystallizations from ether gives analytically pure, white crystals, M.P. 112°–113.5° C.;

$\lambda_{max.}^{EtOH}$ m$\mu$ ($\epsilon$) 118 (11,400); $\nu_{max.}^{Nujol}$ 808 (m), 1025 (m), 1058 (s), 1107 (m), 1530 (s), 1688 (vs), 3320 (s) cm.$^{-1}$; $\nu_{max.}^{CHC}$ 1050 (s), 1527 (m), 1704 (vs), 2850 (m), 2420 (m) cm.$^{-1}$.

Analysis for $C_{20}H_2NCl_2O_5$—Calc.: C, 55.56; H, 6.29; Cl, 16.40. Found: C, 55.59; H, 6.52; Cl, 16.32, 16.54.

It is understood that the foregoing detailed description is given merely by way of illustration and that many variations may be made therein without departing from the spirit of our invention.

Having described our invention, what we desire to secure by Letters Patent is:

1. D-threo-1-[p-2-(cyclohexyl - 1,3 - dioxolan - 2-yl)phenyl]-2-(2,2-dichloroacetamido)1,3-propanediol.
2. D-threo-1-[p-2-(cyclohexyl - 1,3 - dioxolan - 2 - yl)phenyl]-2-amino-1,3-propanediol.

References Cited by the Examiner
UNITED STATES PATENTS

| | | | |
|---|---|---|---|
| 2,830,088 | 4/1958 | Scheffler et al. | 260—340.9 |
| 3,118,941 | 1/1964 | Swett et al. | 260—570.5 |

OTHER REFERENCES

Migrdichian, Organic Synthesis, vol. 1 (1957), pp. 376 and 377, Reinhold Publ. Corp., New York, N.Y.

ALEX MAZEL, *Primary Examiner.*

J. H. TURNIPSEED, *Assistant Examiner.*